US008555761B2

(12) United States Patent
Keily et al.

(10) Patent No.: US 8,555,761 B2
(45) Date of Patent: Oct. 15, 2013

(54) PAPER SHEET MATERIAL DISPENSER APPARATUS

(75) Inventors: Joel P. Keily, Corona, CA (US); Niko Anthony Cvjetkovic, Los Alamitos, CA (US)

(73) Assignee: Dispensing Dynamics International, City of Industry, CA (US)

( * ) Notice: Subject to any disclaimer, the term of this patent is extended or adjusted under 35 U.S.C. 154(b) by 0 days.

(21) Appl. No.: 13/466,334

(22) Filed: May 8, 2012

(65) Prior Publication Data

US 2013/0193258 A1 Aug. 1, 2013

Related U.S. Application Data

(63) Continuation-in-part of application No. 12/290,220, filed on Oct. 28, 2008, now abandoned.

(51) Int. Cl.
*B23D 25/12* (2006.01)

(52) U.S. Cl.
USPC ................................................ 83/343; 83/649

(58) Field of Classification Search
USPC .......... 225/4, 10, 12, 39, 43, 46; 83/649, 343, 83/337, 658, 659, 745, 346, 347
See application file for complete search history.

(56) References Cited

U.S. PATENT DOCUMENTS

| | | | | |
|---|---|---|---|---|
| 790,490 | A | 5/1905 | Ernst | |
| 3,715,085 | A | 2/1973 | Kobayashi et al. | |
| 3,730,409 | A | 5/1973 | Ratti | |
| 3,737,087 | A | 6/1973 | Rooklyn | |
| 3,949,918 | A | 4/1976 | Golner et al. | |
| 3,998,308 | A * | 12/1976 | Yeakley | 194/241 |
| 4,122,738 | A | 10/1978 | Granger | |
| 4,170,390 | A | 10/1979 | McCabe | |
| 4,270,818 | A | 6/1981 | McCabe | |
| 4,573,750 | A | 3/1986 | Golby | |
| 4,666,099 | A | 5/1987 | Hoffman et al. | |
| 4,676,131 | A | 6/1987 | Cassia | |
| 4,717,043 | A | 1/1988 | Groover et al. | |
| 4,721,265 | A | 1/1988 | Hawkins | |
| 4,738,176 | A | 4/1988 | Cassia | |
| 4,790,490 | A | 12/1988 | Chakravorty | |
| 4,796,825 | A | 1/1989 | Hawkins | |
| 4,826,262 | A | 5/1989 | Hartman et al. | |
| 4,848,854 | A | 7/1989 | Kennedy | |
| 4,960,248 | A | 10/1990 | Bauer et al. | |
| 5,131,302 | A | 7/1992 | Watanabe | |
| 5,244,263 | A | 9/1993 | Kennedy | |
| 5,335,811 | A | 8/1994 | Morand | |
| 5,340,045 | A | 8/1994 | Arabian et al. | |
| 5,375,920 | A | 12/1994 | Macchi Cassia | |

(Continued)

FOREIGN PATENT DOCUMENTS

| | | |
|---|---|---|
| WO | WO 99/59457 | 11/1999 |
| WO | WO0063100 | 10/2000 |

*Primary Examiner* — Sean Michalski
(74) *Attorney, Agent, or Firm* — Thomas R. Lampe

(57) ABSTRACT

Toweling or other paper sheet material dispenser apparatus includes a sheet material support roller carrying a movable cutter blade. A user pulls on a sheet material tail to rotate the sheet material support roller and transport the sheet material. After the sheet material is substantially or completely severed by a cutter blade on the roller, an electric switch is closed and an electric motor energized to drive the roller and present a new tail to be pulled by a user.

16 Claims, 6 Drawing Sheets

(56) References Cited

U.S. PATENT DOCUMENTS

| | | | |
|---|---|---|---|
| 5,417,783 | A | 5/1995 | Boreali et al. |
| 5,441,189 | A | 8/1995 | Formon et al. |
| 5,452,832 | A | 9/1995 | Niada |
| 5,630,526 | A | 5/1997 | Moody |
| 5,657,945 | A | 8/1997 | Bryant |
| 5,691,919 | A | 11/1997 | Gemmell et al. |
| 5,772,291 | A | 6/1998 | Byrd et al. |
| 5,816,514 | A | 10/1998 | Duclos et al. |
| 5,878,381 | A | 3/1999 | Gemmell et al. |
| 6,012,664 | A | 1/2000 | Duclos et al. |
| 6,079,305 | A | 6/2000 | Bloch et al. |
| 6,105,898 | A | 8/2000 | Byrd et al. |
| 6,112,631 | A | 9/2000 | VanAlstine |
| 6,314,850 | B1 | 11/2001 | Morand |
| 6,363,824 | B1 | 4/2002 | Granger |
| 6,412,655 | B1 | 7/2002 | Stuetzel et al. |
| 6,412,679 | B2 | 7/2002 | Formon et al. |
| 6,419,136 | B2 | 7/2002 | Formon et al. |
| 6,446,901 | B1 | 9/2002 | Haen et al. |
| 6,553,879 | B2 | 4/2003 | Morand |
| 6,820,785 | B2 | 11/2004 | Kapiloff |
| 6,892,620 | B2 | 5/2005 | Kapiloff |
| 7,044,421 | B1 | 5/2006 | Omdoll et al. |
| 7,354,015 | B2 | 4/2008 | Byrd et al. |
| 7,398,944 | B2 | 7/2008 | Lewis et al. |
| 7,987,756 | B2 | 8/2011 | Lewis et al. |
| 8,082,827 | B2 | 12/2011 | Friesen et al. |
| 2002/0088837 | A1* | 7/2002 | Formon et al. .................... 225/1 |
| 2011/0133019 | A1* | 6/2011 | Keily et al. .................. 242/564 |
| 2011/0168831 | A1* | 7/2011 | Mok et al. ................. 242/564.4 |

* cited by examiner

PAPER SHEET MATERIAL DISPENSER APPARATUS

This application is a continuation-in-part of U.S. patent application Ser. No. 12/290,220, filed Oct. 28, 2008 now abandoned.

TECHNICAL FIELD

This invention relates to apparatus for dispensing paper toweling or other paper sheet material from a roll. More particularly, the dispenser apparatus incorporates an electric motor for facilitating dispensing of the toweling or other paper sheet material.

BACKGROUND OF THE INVENTION

Many dispenser systems are known in the prior art for dispensing paper toweling from rolls thereof. In some cases, the paper toweling is comprised of individual paper towel segments separated by perforated tear lines, and in others the toweling has no perforated tear lines formed therein, severing or cutting individual sheets from the toweling accomplished by some suitable severing structure incorporated in the dispenser.

Many towel dispensers of a purely mechanical nature have been developed and utilized over the years for dispensing paper towels, including dispensers which are actuated by a user grasping and pulling on a tail of the toweling extending from the dispenser housing.

For example, U.S. Pat. Nos. 6,314,850 and 6,553,879 disclose apparatus for dispensing paper toweling including a rotatable toweling support roller and a cutter blade pivotally mounted on the outer peripheral portion of the roller. The blade is movable between a first position in which the cutting edge of the blade is positioned closely adjacent to the outer peripheral portion and a second position in which the blade is disposed at an angle relative to the outer peripheral portion with the cutting edge of the blade spaced from the toweling support roller. The cutter blade when in the second position projects in a direction generally opposed to the direction of rotation of the toweling support roller. Pulling force exerted on the toweling by a user not only serves to rotate the toweling support roller but also cause the toweling to bear against the cutting edge of the cutter blade to sever the toweling.

The apparatus of U.S. Pat. Nos. 6,314,850 and 6,553,879 has met with considerable commercial success; however, some problems with “tabbing” have occurred during use of the dispenser. Tabbing occurs when a piece of towel tears from the sheet when a user grasps and pulls the paper. Tabbing may occur with one or two hand pulls. Papers that absorb water at the greatest rate are most likely to tab, the rate of water absorbency varying by paper manufacturer and grade. Tabbing also becomes a particular problem when low basis weight paper is to be dispensed. It is not an exaggeration to say that virtually all paper towel dispensers of a purely mechanical nature which rely on direct pulling of the toweling by a user to transport the toweling and actuate movable cutter or severing blades have a tabbing problem to some extent.

Electro-mechanical dispensers employing an electric motor to transport toweling and actuate cutter mechanisms are also well known. Such arrangements include both dispensers which are manually actuated, as by means of a push button and those employing a sensor, such as a sensor sensing proximity of a user’s hand, to initiate operation.

U.S. Pat. No. 6,820,785, issued Nov. 23, 2004, discloses an electro-mechanical roll towel dispenser including a housing with a roll carrier disposed therein to rotationally support a roll of towel material. An electro-mechanical feed mechanism is disposed in the housing to dispense measured sheets of the towel material. The feed mechanism operates in a first mechanical operational mode wherein the towel sheets are dispensed by a user grasping and pulling on a tail of the towel material extending from the housing, and a second electrical operational mode wherein a measured length of a next sheet is automatically fed from the housing to define the tail for the next user.

The dispenser of U.S. Pat. No. 6,820,785 includes a sensor for detecting a parameter that is changed by an initial pull exerted on a tail of a web of material extending from the opening of the dispenser. The sensor also generates a signal sent from the sensor to a control circuit or circuitry causing the motor employed in the apparatus to drive the feed mechanism until a measured length of web material that includes the tail of web material has been fed from the dispenser in the form of a measured sheet for subsequent removal by the user.

Similar devices are disclosed in U.S. Pat. No. 3,730,409 and Patent Publication Document WO 00/63100. The devices of these latter two documents have sensors for detecting movement of a tail end of web material such that the feed mechanism is activated in response to detecting the movement.

U.S. Pat. No. 8,082,827, issued Dec. 27, 2011, discloses a towel dispenser which incorporates a one-way rotational coupling enabling the dispenser to be operated by motor or in a manual dispensing mode separately from the motor.

U.S. Pat. No. 7,987,756, issued Aug. 2, 2011, discloses a dispenser for paper toweling which incorporates a cutter blade within an actuator roller carrying paper toweling. A drive motor is activated to drive the actuator roller during the time the cutter blade is extended to cut the paper toweling and deactivated when the cutter blade is retracted.

The following documents are also believed to be representative of the current state of the prior art in this field: U.S. Pat. No. 3,715,085, issued Feb. 6, 1973, U.S. Pat. No. 3,730,409, issued May 1, 1973, U.S. Pat. No. 3,737,087, issued Jun. 5, 1973, U.S. Pat. No. 3,949,918, issued Apr. 13, 1976, U.S. Pat. No. 3,998,308, issued Dec. 21, 1976, U.S. Pat. No. 4,666,099, issued May 19, 1987, U.S. Pat. No. 4,676,131, issued Jun. 30, 1987, U.S. Pat. No. 4,721,265, issued Jan. 26, 1988, U.S. Pat. No. 4,738,176, issued Apr. 19, 1988, U.S. Pat. No. 4,790,490, issued Dec. 13, 1988, U.S. Pat. No. 4,796,825, issued January, 1989, U.S. Pat. No. 4,960,248, issued Oct. 2, 1990, U.S. Pat. No. 5,131,302, issued Jul. 21, 1992, U.S. Pat. No. 5,452,832, issued Sep. 26, 1995, U.S. Pat. No. 5,772,291, issued Jun. 30, 1998, U.S. Pat. No. 6,079,305, issued Jun. 27, 2000, U.S. Pat. No. 6,105,898, issued Aug. 22, 2000, U.S. Pat. No. 6,412,655, issued Jul. 2, 2002, U.S. Pat. No. 6,412,679, issued Jul. 2, 2002, Patent Document No. WO 9959457, dated November, 1999, Patent Document No. WO 0063100, dated October, 2000, U.S. Pat. No. 7,398,944, issued Jul. 15, 2008, U.S. Pat. No. 6,892,620, issued May 17, 2005, U.S. Pat. No. 7,044,421, issued May 16, 2006, U.S. Pat. No. 4,573,750, issued Mar. 4, 1986, U.S. Pat. No. 4,826,262, issued May 2, 1989, U.S. Pat. No. 6,446,901, issued Sep. 10, 2002, U.S. Pat. No. 4,270,818, issued Jun. 2, 1981, U.S. Pat. No. 6,112,631, issued Sep. 5, 2000, U.S. Pat. No. 5,375,920, issued Dec. 27, 1994, U.S. Pat. No. 7,354,015, issued Apr. 8, 2008, U.S. Pat. No. 4,738,176, issued Apr. 19, 1988, U.S. Pat. No. 790,490, issued Dec. 13, 1988, U.S. Pat. No. 6,079,305, issued Jun. 27, 2000, U.S. Pat. No. 6,419,136, issued Jul. 16, 2002, U.S. Pat. No. 6,412,679, issued Jul. 2, 2002, U.S. Pat. No. 5,441,189, issued Aug. 15, 1995, U.S. Pat. No. 5,878,381, issued Mar. 2, 1999, U.S. Pat. No. 5,691,919, issued Nov. 25, 1997, U.S. Pat. No. 5,452,832, issued Sep. 26, 1995, U.S. Pat. No. 5,340,045, issued Aug. 23, 1994, U.S. Pat. No. 5,335,811, issued Aug. 9, 1994, U.S. Pat. No. 5,244,263, issued Sep. 14, 1993, U.S. Pat. No. 4,848,854, issued Jul. 18, 1989, U.S. Pat. No. 4,738,176, issued Apr. 19, 1988, U.S. Pat. No. 4,270,818, issued Jun. 2, 1981, U.S. Pat. No. 4,170,390, issued Oct. 9, 1979, U.S. Pat. No. 5,657,945, issued Aug. 19, 1997, U.S. Pat. No. 4,122,738, issued Oct. 31, 1978, U.S. Pat. No. 6,012,664, issued Jan. 11, 2000, U.S. Pat. No. 5,816,514, issued Oct. 6, 1998, U.S. Pat. No. 5,417,783, issued May 23, 1995, U.S. Pat. No. 4,717,043, issued Jan. 5, 1988, U.S. Pat. No. 5,630,526, issued May 20, 1997 and U.S. Pat. No. 6,363,824.

DISCLOSURE OF INVENTION

The present invention relates to a paper toweling dispenser apparatus which is electro-mechanical in nature to provide electric motor assisted dispensing and which is relatively simple, inexpensive and reliable.

The apparatus lowers the consumption of electrical energy required for operation, thus prolonging battery life.

The apparatus provides consistent tail length externally of the housing thereof for manual grasping and pulling by a user.

The motor eliminates the need for toweling support roller return springs, an expedient employed in U.S. Pat. No. 6,314,850, for example, to return the toweling support roller to an initial or rest position wherein a new toweling tail extends from the housing of the apparatus for access by the next user, providing a reduction of required pull force and consequent tabbing. In the arrangement of U.S. Pat. No. 6,314,850, springs must be tensioned during initial rotation of the toweling by manually pulling the toweling. This requires higher pulling forces, increasing the likelihood of tabbing.

Activation and deactivation of the electric motor is accomplished by means of a simple switch, thus no circuit board or complicated sensor/control circuitry is required.

The paper toweling dispenser apparatus of the present invention includes a roll support for rotatably supporting a roll of paper toweling having a tail and a housing defining an opening.

A rotatable toweling support roller is spaced from the roll support for receiving paper toweling from the roll of paper toweling, the toweling support roller having a cylindrically-shaped outer peripheral surface.

An electric motor is operatively associated with the toweling support roller for selectively rotating the toweling support roller.

The apparatus also includes an electric switch operatively associated with the electric motor and with the toweling support roller. The electric switch is responsive to rotation of the toweling support roller caused by a user of the paper towel dispenser apparatus pulling on the paper toweling tail projecting through the opening and extending outwardly from the housing to a first position to energize the electric motor when the toweling support roller reaches the first position and cause rotation of the rotatable toweling support roller by the electric motor from the first position to a second position.

A cutter blade is provided for substantially or completely severing the paper on the toweling support roller during rotation thereof caused solely by the user pulling on the paper toweling tail and without energization and use of the electric motor before the toweling support roller reaches the first position.

The electric switch is responsive to rotation of said toweling support roller by the energized electric motor to the second position to de-energize the electric motor and present a new tail projecting through the opening and extending outwardly from the housing.

Other features, advantages and objects of the present invention will become apparent with reference to the following description and accompanying drawings.

MODES FOR CARRYING OUT THE INVENTION

Figure 1:
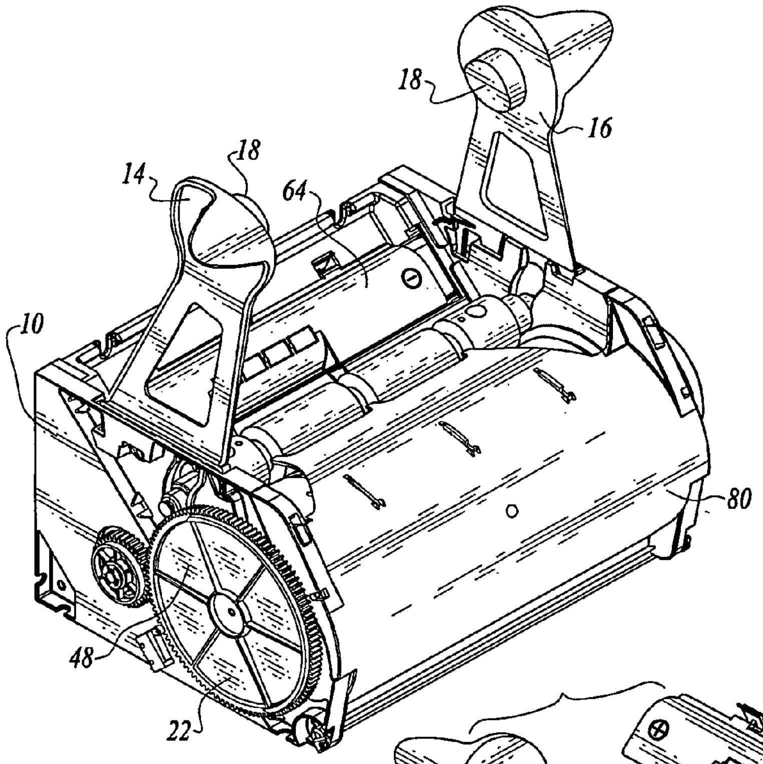
FIG. 1 is a perspective view of apparatus constructed in accordance with the teachings of the present invention, the outer cabinet having been removed.

Referring now to FIGS. 1-12 of the drawings, a paper sheet material dispenser apparatus constructed in accordance with the teachings of the present invention is illustrated, the apparatus for dispensing sheet material in the form of paper toweling from a roll of paper toweling R. The apparatus includes a housing 10 which is suitably positioned in an outer paper towel dispenser cabinet (not shown) and secured thereto by any suitable expedient such as screws or other suitable mechanical fasteners.

A roll support is operatively associated with the housing 10 to rotatably support a roll of paper toweling R (FIG. 4) in a conventional fashion. Toweling 12 from the roll is shown in FIGS. 4, 5, 7, 9 and 11 and identified by reference numeral 12. As is conventional, the disclosed roll support includes two double-ended arms 14, 16 spaced from one another and roll engagement members 18 at the distal or upper ends of the arms for entering the ends of the roll.

A rotatable toweling support roller 22 is rotatably mounted within the housing 10 for receiving toweling 12 and supporting and transporting the toweling. The rotatable toweling support roller 22 has a cylindrically-shaped outer peripheral surface and is rotatable in a predetermined direction of rotation when pulling forces are applied to the toweling supported thereby. Stub shafts project from the ends of the toweling support roller and in turn are supported by the housing. A cutter blade 26 is pivotally connected to the toweling support roller. Cutter blade 26 has attached to the ends thereof cam followers 30, each including a cam follower arm 32 and a roller 34. Each roller 34 rides in a channel 36 of a cam 38. Cams 38 are located at both ends of the housing, it being understood that the channels 36 of these cams are directed inwardly.

Rotation of toweling support roller 22 will cause the cam followers to move along the cam surfaces defining channels 36. This, in turn, will cause the cutter blade 26 to pivot relative to the toweling support roller 22.

The cutter blade is movable between an inactive position (shown in FIG. 5) wherein the cutter will not sever the toweling and a severing position (see FIG. 7) wherein the cutting edge of the cutter blade is positioned outwardly of the toweling support roller to at least partially sever the toweling on the toweling support roller, an operation which will be described below.

The dispenser apparatus structure described thus far is essentially that disclosed in U.S. Pat. Nos. 6,314,850 and 6,553,879. As disclosed in those patents, the cutter blade when in its inactive or first position lies substantially flat against the toweling support roller with the cutting edge positioned closely adjacent to the cylindrically-shaped outer peripheral surface and a severing or second position wherein the cutting edge of the blade is positioned outwardly of the toweling support roller and disposed at an angle relative to the outer peripheral surface thereof. The cutter blade when in the second position, projects from the pivot in a direction generally opposed to the direction of rotation of the toweling support roller.

In the paper toweling dispenser apparatus disclosed and claimed herein, an electric motor 40 is operatively associated with the toweling support roller to selectively rotate the toweling support roller.

In addition, an electric switch 42 is operatively associated with the electric motor and with the toweling support roller. The electric switch is electrically connected to the electric motor, with no control circuit boards intermediate the electric motor and the electric switch.

The electric switch 42 is responsive to rotation of the toweling support roller 22 by a user of the paper towel dispenser from a rest or inactive position to a first position to energize the electric motor when the toweling support roller reaches the first position and cause rotation of the toweling support roller by the electric motor from the first position to a second position and reducing the pull force required by a user pulling the paper toweling during rotation of the toweling support roller between the first position and the second position. Further, the electric switch is responsive to rotation of the toweling support roller beyond the second position to de-energize the electric motor. This operation is described in more detail below.

Electric switch 42 includes a switch actuator element 44 having a roller 46 at the end thereof which is biased into engagement with a circular end 48 of the toweling support roller 22. The switch actuator element alternatively opens or closes the switch during rotation of the toweling support roller.

Located at circular end 48 of the toweling support roller and engaged by the switch actuator element roller during rotation of the toweling support roller is an arcuate projection 50. The projection extends only part way along the periphery of the toweling support roller and has two tapered projection ends 52.

Figure 2:
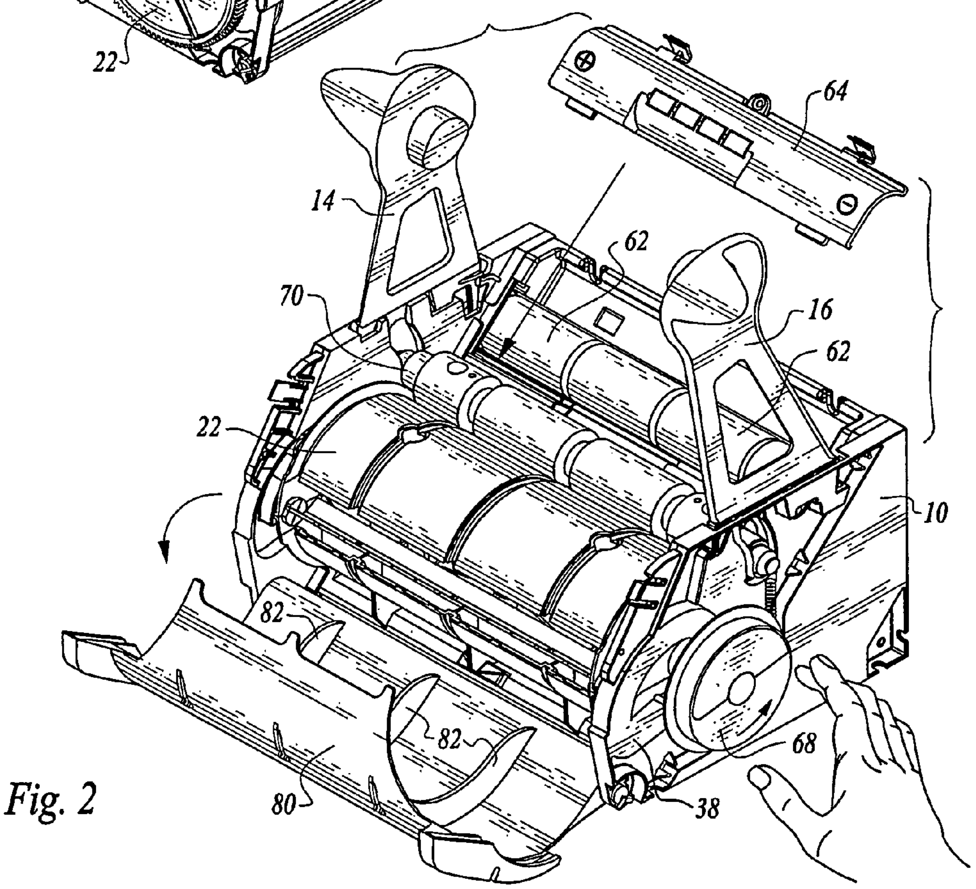
FIG. 2 is a view similar to FIG. 1, but illustrating a battery cover removed to illustrate batteries, and a finger guide plate pivoted from its normal position shown in FIG. 1 wherein it partially surrounds and covers the toweling support roller.
Figure 4:
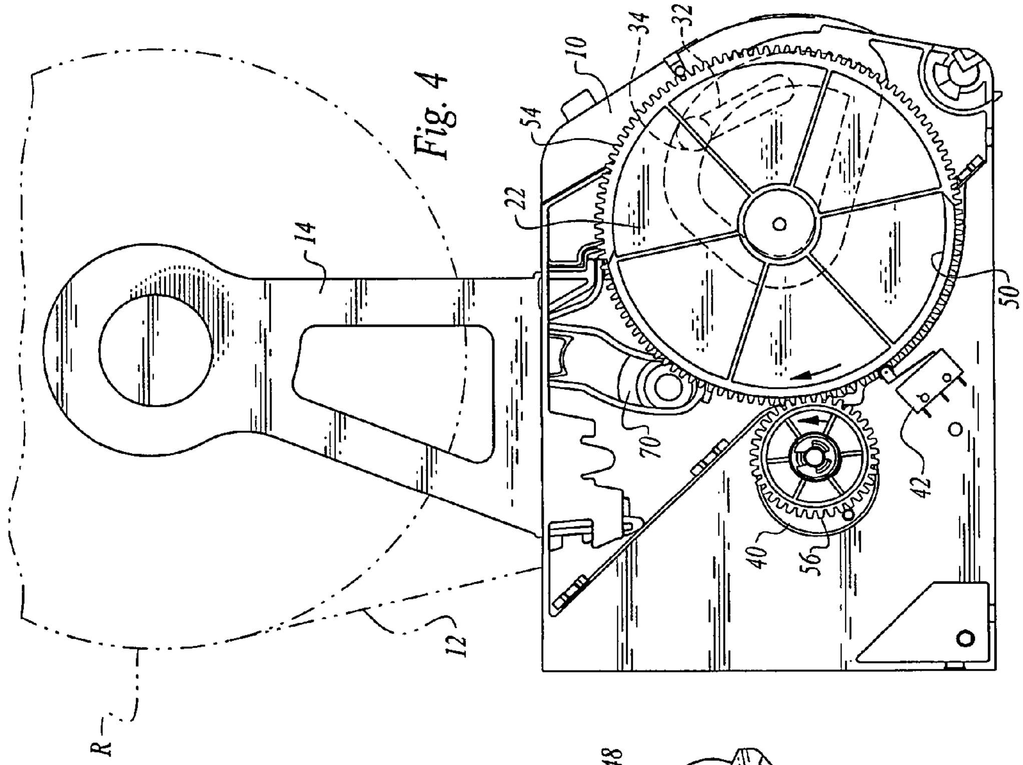
FIG. 4 is a side, elevational view of the apparatus and showing in dash lines relative placement of a cam follower of blade actuator structure of the invention positioned relative to a channel of a cam during a stage of operation wherein an electric motor is utilized to rotate the toweling support roller.

Extending completely about circular end 48 and disposed inwardly of the arcuate projection, is a toweling support roller gear 54 having teeth. Meshing with the teeth of the toweling support roller gear are teeth of a drive gear 56 which is driven by electric motor 40, the latter suitably being in the form of a DC gear motor. A one-way clutch needle bearing 58 connects the drive gear to the electric motor to allow the performance of certain functions indicated below. Electric wiring 60 connects the switch 42 to the electric motor. The electric switch is located between the electric motor and a source of DC power in the form of electric batteries 62 (see FIG. 2). In the interest of simplicity, the conventional wiring extending between the switch and the batteries is not illustrated. The batteries are normally covered by a cover plate 64 readily snapped into or out of position as depicted in FIGS. 1 and 2.

FIGS. 5 through 12 provide an illustration of the operation of the dispenser apparatus, including a dash line illustration in FIGS. 5, 7, 9 and 11 of the location of the blade and follower during consecutive stages in the operation of the apparatus.

Figure 5:
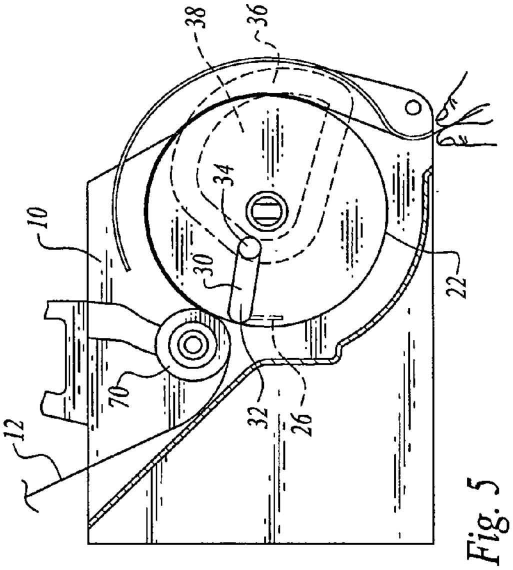
FIG. 5 is a diagrammatic presentation illustrating the condition of structural elements of the apparatus at the point of operation where a user has grasped the tail of toweling and initiates pulling.
Figure 6:
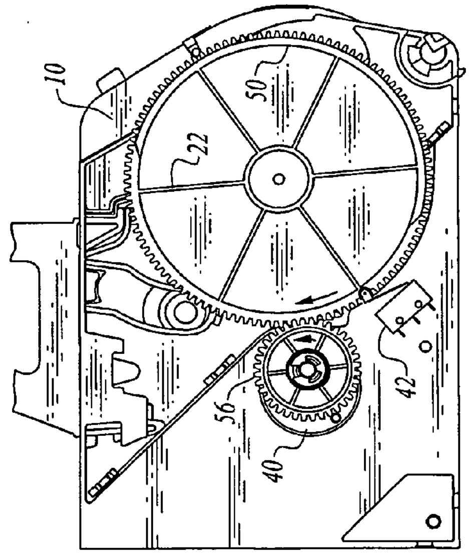
FIG. 6 illustrates the condition of structural components of the invention when pulling is initiated by the hand of a user grasping the toweling tail during the stage of operation shown in FIG. 5.

FIGS. 5 and 6 illustrate the condition of the various components when pulling of toweling 12 by a user begins.

The toweling tail may be brought to the position illustrated in FIG. 5 by manually rotating the toweling dispenser roller 22 by a rotatable manually engageable element in the form of a handle or knob 68 connected to the toweling support roller. A one-way clutch (not shown) may be employed to ensure that the toweling support roller is being rotated in a direction to advance the toweling. The handle 68 can also be used to advance and dispense the toweling if the batteries fail. The user can pull on the tail as usual when not utilizing the apparatus in motor assisted mode. In this non-motor-driven mode, the required pull force is still relatively low since the gear motor is in effect disengaged from the toweling support roller by employing the one-way clutch needle bearing 58 or some other suitable one-way clutch mechanism.

Figure 7:
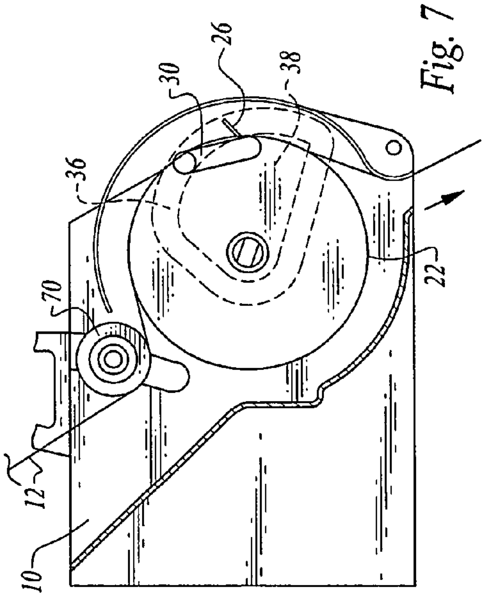
FIG. 7 is a view similar to FIG. 5, but illustrating a stage of operation of the apparatus wherein a cutter blade is in severing position and the electric motor is energized to reduce the pulling forces required by the user.
Figure 8:
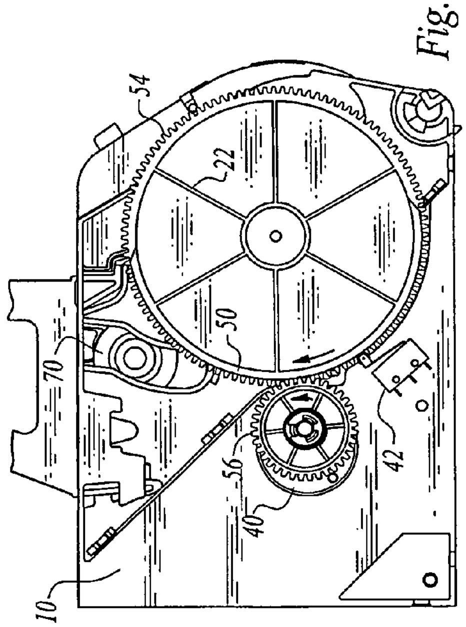
FIG. 8 is a view similar to FIG. 6, but illustrating the condition of structural components in the stage of operation of FIG. 7.

Continued pulling of the toweling tail results in the condition illustrated in FIGS. 7 and 8. The switch 42 is closed since the switch actuator element 44 engages projection 50. Thus, the motor is energized and drives the toweling support roller gear and drive gear as shown by the arrows in FIG. 8. This results in significant reduction in the pulling force that would otherwise be required by the user pulling the toweling tail, greatly reducing the problem of tabbing. It will be appreciated that the motor is energized when the pulling forces necessary would otherwise be at their greatest, since the cutting blade is being moved into its severing position as shown in FIG. 7.

Figure 3:
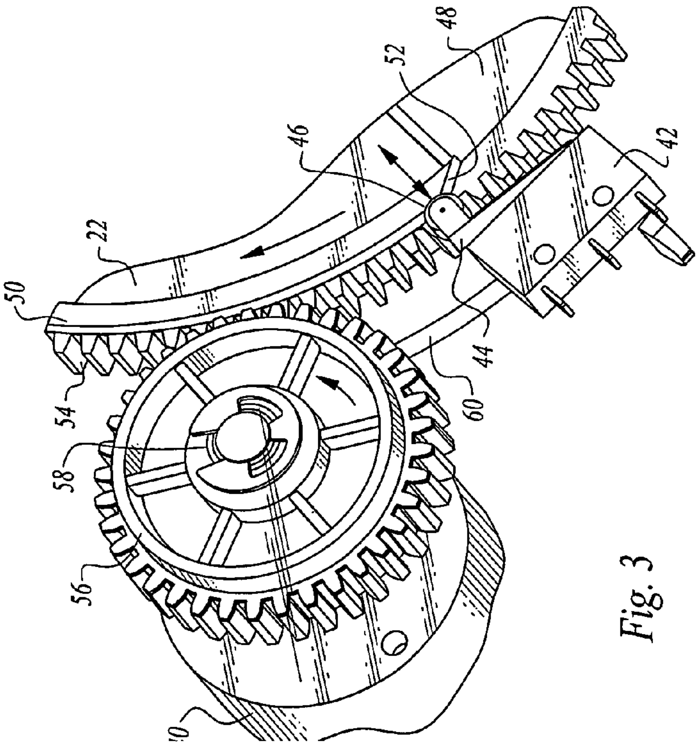
FIG. 3 is an enlarged, perspective view illustrating a motor driven drive gear with the teeth thereof meshing with teeth of a circular toweling support roller gear, only a portion of the latter being illustrated.
Figure 9:
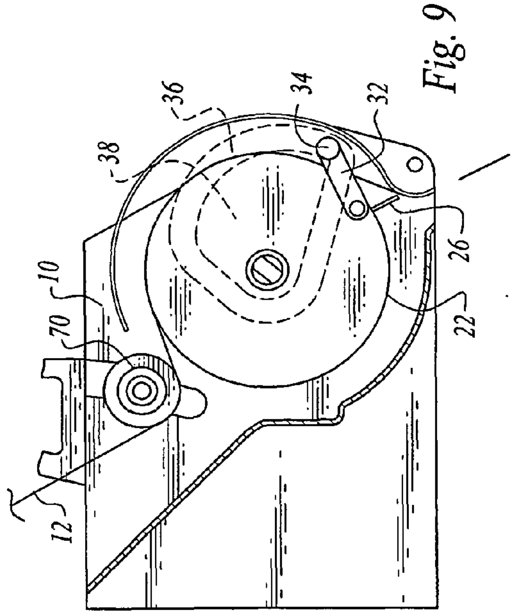
FIG. 9 is a view similar to FIGS. 5 and 7, but showing the endmost sheet of toweling having been severed by the blade and the electric motor still operating to rotate the toweling support roller.
Figure 10:
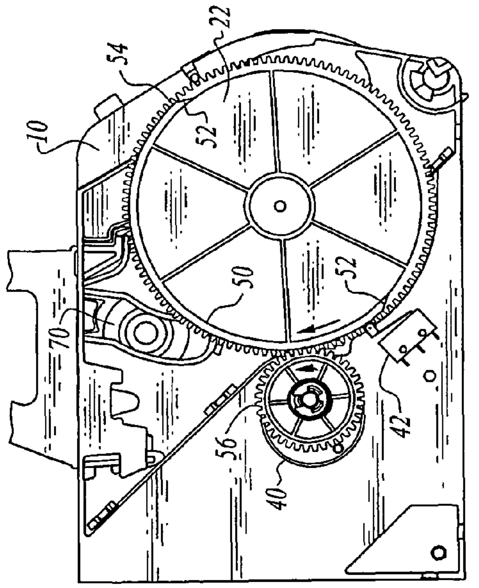
FIG. 10 is a view similar to FIGS. 6 and 8 showing the condition of the structural elements of the apparatus in the stage of operation of FIG. 9.
Figure 11:
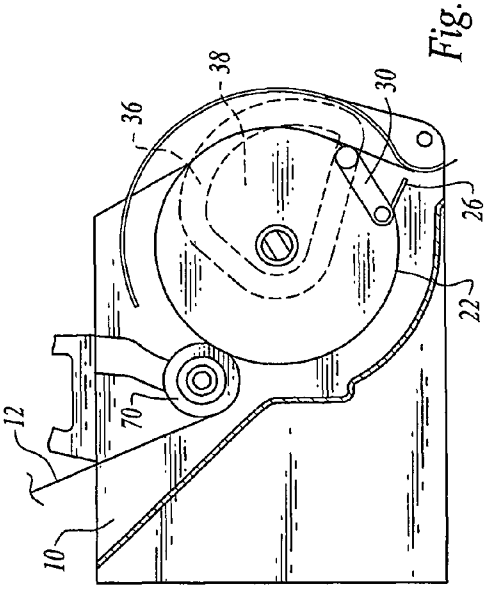
FIG. 11 is a view similar to FIGS. 5, 7 and 9 illustrating the toweling support roller further rotated, the motor de-energized, and a new tail end in the process of being presented to be grasped by a user.
Figure 12:
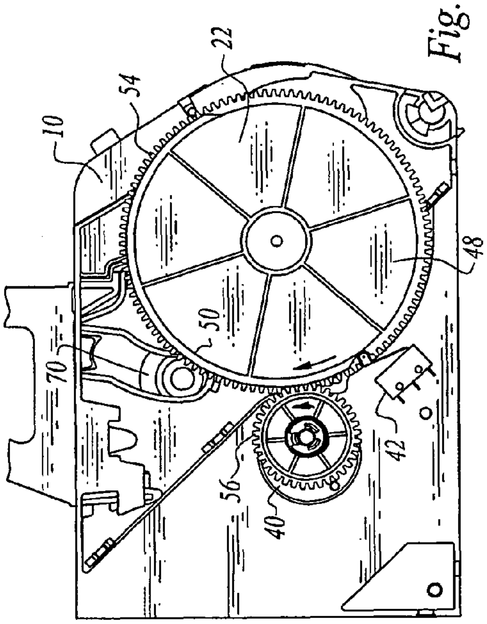
FIG. 12 is a view similar to FIGS. 6, 8 and 10 showing the condition of the structural elements of the apparatus in the stage of operation illustrated in FIG. 11, the electric motor having been de-energized and momentum in the process of returning the toweling support roller to its initial or rest position.

FIGS. 9 and 10 show the condition of the structural components when an individual towel has been severed from the toweling and a new tail end is in the process of being presented to the user. In the arrangement illustrated, and as disclosed in U.S. Pat. Nos. 6,314,850 and 6,553,879, severing is accomplished by the user pulling on the tail when the blade is at the angled position represented in FIG. 7. As indicated in FIG. 10, after severing, the motor will continue to rotate the toweling support roller to advance the next tail. This continues until the structural elements reach the condition shown in FIGS. 11 and 12 wherein the switch is opened to de-energize the electric motor during or after passage of the rearmost tapered end of the projection 50 past the switch. FIG. 3 shows the switch actuator element 44 just prior to passage of the rearmost projection end 52. The tapered projection ends facilitate engagement with the arcuate projection and disengagement therefrom. After de-energization, the momentum of the toweling support roller will bring it back to its initial inactive or rest position until the newly presented tail is pulled to again begin dispensing. The one-way clutch employed in the drive gear 56 results in the de-energized electric motor not impeding this final movement of the toweling support roller.

The toweling dispenser apparatus includes another feature which also reduces likelihood of tabbing. A shock reducing element in the form of a freely rotatable roller 70 mounted for up and down movement within slots formed in opposed sides the housing is located in the path of the paper toweling extending between the toweling support roller and the roll support. If slack exists in the toweling, as illustrated for example in FIG. 5, pulling and consequent tautening of the toweling will cause the roller 70 to move upwardly as shown in FIG. 7. This reduces pulling forces at the tail distal end which might otherwise occur as a result from the shock resulting from taking up of the slack during pulling.

A curved plate 80 having curved pressure fingers 82 is pivotally attached to housing 10 and is movable between an open position (FIG. 2) and a closed position (FIG. 1). When in the closed position, the fingers are used to exert a downward force on the toweling on toweling support roller 22 to facilitate cutting of the toweling. If complete cutting or severing of a sheet from the toweling is desired without the user pulling on the sheet to tension it against the blade, a finger or fingers may be designed to hold the paper toweling in firm engagement with the surface of the toweling support roller.

By changing the configuration of the projection 50, the lengths of the tails projecting from the dispenser can be changed. Also, actual total sheet length can be changed by employing toweling support rollers of different drum diameters.

FIGS. 13-17 relate to an alternative embodiment of the invention. In this embodiment of the invention, a tail is present and projecting from the dispenser which is grasped by the user to begin dispensing, as was the case with the previously described embodiment. However, in this embodiment the electric motor is not energized until a sheet is substantially or completely severed by the cutter blade. After severing of the sheet, as shown in FIG. 9, the switch 42 is closed and the tail of the remainder of the paper toweling extends through an opening in the housing of the paper towel dispenser apparatus and extends downward therefrom for grasping by the next user.

The FIGS. 14-17 conform to the FIGS. 9-12 relating to the first embodiment and the structural components are the same except for one difference. In the FIGS. 13-17 embodiment the projection 50 has been substantially shortened so that it is engaged with the switch to close the switch only for a shorter duration but one sufficient to complete rotation of the rotatable toweling support roller to the position shown in FIG. 11 wherein the new tail projects through the housing opening and extends outwardly from the housing a desired predetermined distance. The life of a battery electrical source employed with the dispenser will be sufficiently prolonged utilizing this approach. Of course disengagement between the switch and the projection at this stage will immediately result in termination of rotation of the toweling support roller.

Figure 18:
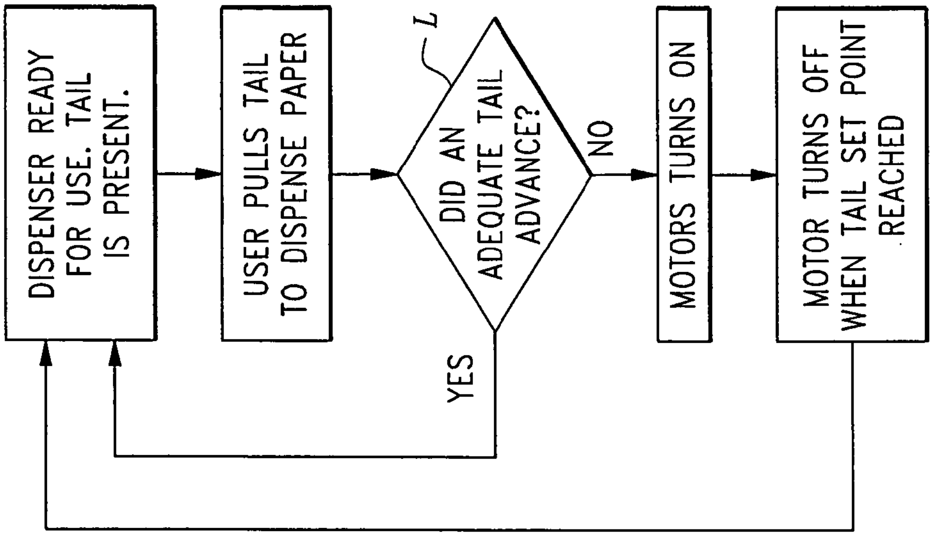
FIG. 18 is a flow chart illustrating operation of a second alternative embodiment of the invention.
Figure 13:
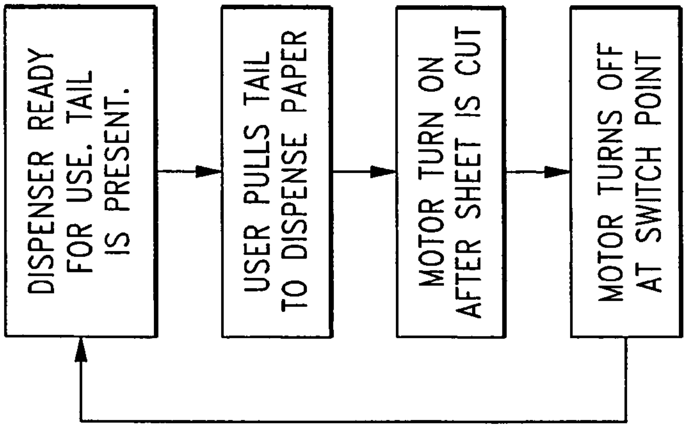
FIG. 13 is a flow chart illustrating operation of a first alternative embodiment of the invention.
Figure 16:
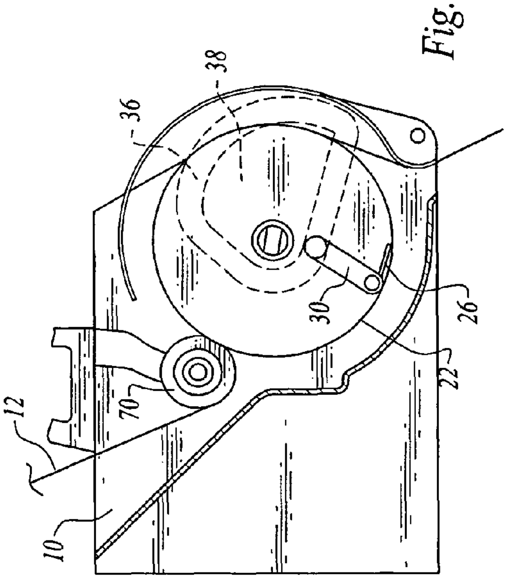
FIGS. 14-17 are views similar to FIGS. 9-12, but illustrating the condition of structural components of the first alternative embodiment in sequential stages of operation.
Figure 17:
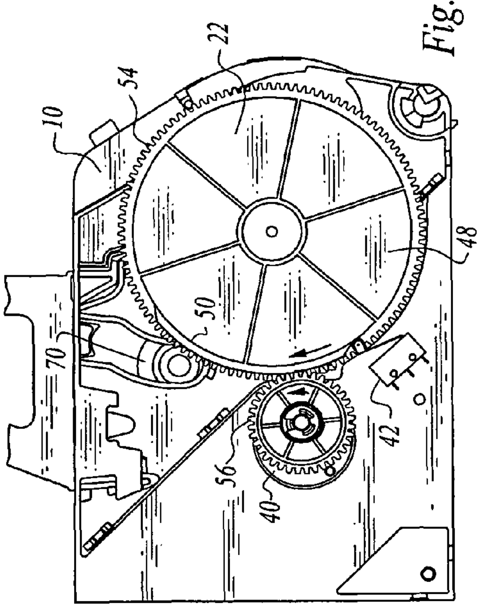
Figure 14:
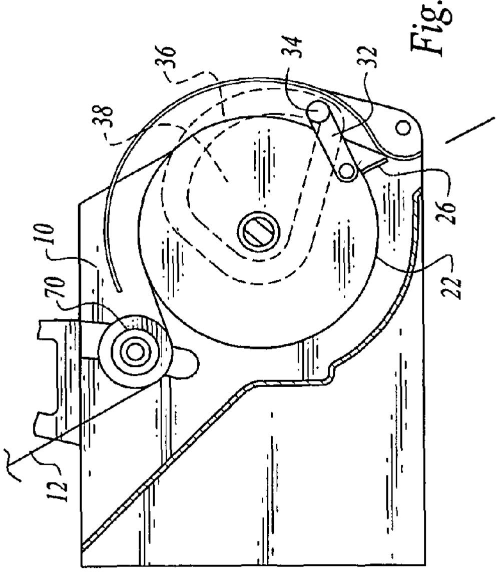
Figure 15:
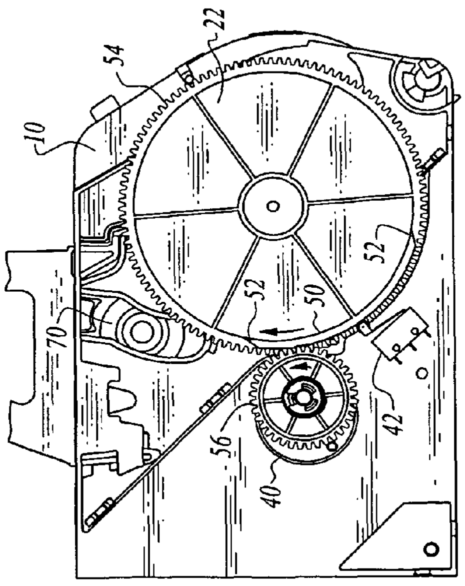

FIG. 18 is a flow chart which illustrates the operation of a second alternative embodiment which is a more advanced version of the first alternative embodiment. In this more advanced version a logic control L functions as a motor control structure operatively associated with the electric motor and the electric switch for preventing energization of the electric motor to rotate the toweling support roller if the momentum of the toweling support roller caused by a user's pull has been sufficient to place a new tail so that a predetermined adequate length thereof extends outwardly from the housing.

Logic is used to determine if an adequate tail is present. This can be done by incorporating a switch or a sensor in the motor control structure. If an adequate tail is present, the motor does not turn on. If an adequate tail isn't present, the motor will turn on until the drum rotates to a switch point that turns off the motor. In addition to prolonging battery life, a consistent tail length is produced and there is less tabbing than when return springs are utilized for this purpose. Drum return springs add to the amount of pull force required to dispense a sheet of toweling.

Sometimes, in practice, users tear a sheet by pulling sideways instead of downward, in which case the toweling support roller may only rotate slightly, if at all. Logic by means of a sensor can detect if paper is present at the paper exit, and energize the motor to rotate one complete cycle, in effect resetting the dispenser for the next user.

The principles of the invention are applicable to paper sheet material other than paper toweling.

The invention claimed is:

1. Paper sheet material dispenser apparatus for dispensing paper sheet material from a roll of paper sheet having a tail, said apparatus comprising, in combination:

a housing defining an opening;

a roll support within said housing for rotatably supporting the roll of paper sheet material;

a rotatable sheet material support roller for receiving paper sheet material from the roll of paper sheet material, said sheet material support roller having a cylindrically-shaped outer peripheral surface;

an electric motor operatively associated with said sheet material support roller for selectively rotating said sheet material support roller;

an electric switch operatively associated with said electric motor and with said sheet material support roller, said electric switch responsive to rotation of said sheet material support roller caused by a user of the paper sheet material dispenser apparatus pulling on the paper sheet material tail projecting through said opening and extending outwardly from said housing to a first position to energize said electric motor when the sheet material support roller reaches said first position and cause rotation of said sheet material support roller by said electric motor from said first position to a second position;

a cutter blade for substantially or completely severing the paper sheet material on said sheet material support roller during rotation thereof caused solely by the user pulling on the paper sheet material tail and without energization and use of said electric motor before said sheet material support roller reaches said first position, and said electric switch responsive to rotation of said sheet material support roller by said energized electric motor to said second position to de-energize said electric motor and present a new tail projecting through said opening and extending outwardly from said housing.

2. The paper sheet material dispenser apparatus according to claim 1 wherein said electric switch includes a switch actuator element engageable with said sheet material support roller to alternatively open or close said switch during rotation of said sheet material support roller.

3. The paper sheet material dispenser apparatus according to claim 2 wherein said sheet material support roller includes a projection, said switch actuator element alternatively being engaged with said projection or disengaged from said projection during rotation of said sheet material support roller.

4. The paper sheet material dispenser apparatus according to claim 3 wherein said projection is arcuate and located at an end of said sheet material support roller.

5. The paper sheet material dispenser apparatus according to claim 4 wherein said projection has tapered projection ends.

6. The paper sheet material dispenser apparatus according to claim 1 additionally comprising a rotatable manually engageable element connected to said sheet material support roller enabling a user to manually rotate said sheet material support roller to advance said paper sheet material.

7. The paper sheet material apparatus according to claim 1 including a drive gear having teeth rotatable by said electric motor and wherein said sheet material support roller includes a sheet material support roller gear having teeth, the teeth of said drive gear engaging the teeth of said sheet material support roller gear whereby said electric motor is operable to drive said sheet material support roller when energized.

8. The paper sheet material apparatus according to claim 7 including a one-way clutch enabling said sheet material support roller to be manually rotated in one direction of rotation with substantially no electric motor drag.

9. The paper sheet material apparatus according to claim 1 wherein said cutter blade is pivotally mounted on said sheet material support roller and blade actuator structure for moving said cutter blade during rotation of said sheet material support roller to sever paper sheet material on said sheet material support roller during rotation of said sheet material support roller before said sheet material support roller reaches said first position.

10. The paper sheet material dispenser apparatus according to claim 9 wherein said blade actuator structure includes a cam follower attached to said blade and cam structure accommodating said cam follower, said cam follower moving in said cam structure during rotation of said sheet material support roller to sever paper sheet material being transported by said sheet material support roller when said sheet material support roller is rotating to said first position.

11. The paper sheet material dispenser apparatus according to claim 10 wherein said cutter blade is pivotally mounted on said sheet material support roller and is movable between an inactive position wherein said cutter blade will not sever said paper sheet material and a severing position wherein a cutting edge of the cutter blade is positioned outwardly of said sheet material support roller to sever the paper sheet material on said sheet material support roller.

12. The paper sheet material dispenser apparatus according to claim 11 wherein said cutter blade moves toward and is substantially in the inactive position prior to energizing said electric motor.

13. The paper sheet material dispenser apparatus according to claim 1 additionally comprising a movable shock reducing element for engaging paper sheet material extending between said roll support and said sheet material support roller and displaceable upon tautening of said paper sheet material during pulling of said paper sheet material.

14. The paper sheet material dispenser apparatus according to claim 1 wherein said electric motor is electrically connected to said electric switch with no control circuit board intermediate the electric motor and the electric switch.

15. The paper sheet material dispenser according to claim 1 additionally comprising a motor control structure operatively associated with said electric motor and said electric switch for preventing energization of said electric motor to rotate the sheet material support roller if the momentum of the sheet material support roller caused by a user's pull has been sufficient to place the new tail with a predetermined adequate length extending outwardly from said housing.

16. The paper sheet material dispenser according to claim 15 wherein said motor control structure is operable to energize said electric motor to further rotate said sheet material support roller if the momentum of the sheet material support roller caused by a user's pull was not sufficient to place the new tail with a predetermined adequate length thereof extending outwardly from the housing.

* * * * *